United States Patent Office 2,819,280
Patented Jan. 7, 1958

2,819,280

PLUTONIUM COMPOUNDS AND PROCESS FOR THEIR PREPARATION

Frederick J. Wolter, Cleveland, Ohio, and Harvey C. Diehl, Jr., Ames, Iowa, assignors to the United States of America as represented by the United States Atomic Energy Commission No Drawing. Application April 20, 1949
Serial No. 88,682

25 Claims. (Cl. 260—429.1)

This invention relates to compounds of plutonium and to a process for their preparation, and it especially relates to a process for the separation of plutonium from aqueous solutions. The present invention also relates to the extraction of plutonium from organic solvent solutions of the plutonium compounds of the subject invention.

It has recently become known that various isotopes of plutonium, the transuranic chemical element having an atomic number of 94, can be prepared by a number of different nuclear processes. For example, it is known that plutonium can be produced in small quantities using a cyclotron for the bombardment of natural uranium with neutrons as follows:

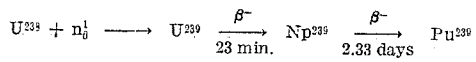

where Np is the chemical symbol for the element neptunium having an atomic number of 93. Other isotopes of plutonium are obtained by neutron bombardment of $Pu^{239}$ as follows:

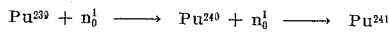

Furthermore, the plutonium isotope of mass 238, referred to as $Pu^{238}$, can be prepared by deuteron bombardment of the uranium isotope of $U^{238}$ to produce $Np^{238}$ followed by beta decay of $Np^{238}$ to $Pu^{238}$.

In addition to the production of plutonium by neutron bombardment of uranium using a cyclotron, neutronic reactors have been developed for the production of plutonium and desirable fission products from natural uranium by a self-sustaining chain reaction. One of the isotopes of uranium occurring in natural uranium is $U^{235}$ and it is present in the amount of 0.71% by weight. When this isotope is bombarded by slow neutrons, preferably of thermal energies, it undergoes fission and releases on an average about two neutrons per fission, in addition to the production of fission fragments of relatively low atomic weights. The main constituent of natural uranium, namely, $U^{238}$, absorbs thermal neutrons to produce $Pu^{239}$ and $Pu^{240}$ by means of the reactions shown above. Both of these isotopes of plutonium can undergo fission by bombardment with slow neutrons as does $U^{235}$ and likewise they produce on an average two neutrons per neutron absorbed when fission occurs. Thus, in a natural uranium neutronic reactor the excess neutrons that are released by fission are sufficient to maintain a production of plutonium through neutron absorption by the predominant uranium isotope $U^{238}$. However, the concentration of plutonium, thus produced, is generally small, rarely being above 1% by weight of the uranium and usually being substantially below this concentration. Thus, it is necessary to recover plutonium and fission products from uranium masses from neutronic reactors having plutonium and fission product concentrations below one part per thousand parts and even one part per million parts of uranium.

As mentioned above, during neutron-irradiation of uranium there are produced, in addition to the transuranic elements, Np and Pu, other elements of lower atomic weight, known as fission fragments. These radioactive fission fragments are composed of two distinct groups of elements, namely, a light element group and a heavy element group. The light element group contains elements having atomic numbers between about 35 and 46 and the heavier element group is composed of atomic numbers between about 51 and 60. The elements of both of these groups as originally produced, being considerably overmassed and undercharged, are highly unstable. By means of beta radiation they quickly transform themselves into isotopes of other elements having longer half-lives. The fission fragments and the resulting decay products are collectively known as fission products.

The various radioactive fission products have half-lives that range from a fraction of a second to thousands of years. Those having very short half-lives may be substantially eliminated by aging the neutron-irradiated material for a reasonable period of time before further processing. Those radioactive fission products having very long half-lives do not have a sufficiently intense radiation to endanger personnel protected by moderate shielding. On the other hand, the radioactive fission products that have half-lives ranging from a few days to a few years have dangerously intense radiations which cannot be eliminated by aging for practical storage periods. The fission products are chiefly the radioactive isotopes of Sr, Y, Zr, Cb, and Ru of the light group and Te, I, Cs, Ba, La, Ce, and Pr of the heavy group.

The material from the neutronic reactor contains an amount of fission products that is about the same order of magnitude as the amount of plutonium present. In order to recover the plutonium, it is necessary to separate it from large masses of uranium and from a large number of elements having lower molecular weights.

By various previously developed processes, it has been possible to remove plutonium from aqueous solutions of salts of uranium, plutonium, and fission products, thereby producing aqueous solutions of salts of plutonium and fission products, usually only rare earth fission products. By additional processes, plutonium salts solutions have been obtained free of uranium salts and fission product salts. By one process, such an aqueous solution of plutonium salt is obtained which contains a lanthanum salt since lanthanum fluoride is used as a carrier precipitate for separating plutonium from tracer solutions.

It is an object of the present invention to provide new compounds of plutonium.

A second object of this invention is to provide a process for the preparation of these new compounds of plutonium.

A third object of the present invention is to separate plutonium from its aqueous solution.

Another object of this invention is to separate plutonium from a mixture of plutonium and rare earth fission products.

A further object of the present invention is to separate plutonium from an organic solvent solution of the plutonium compound of the subject invention.

It is also an object of this invention to provide a process for separating plutonium from its solution as the plutonium compound of this invention in the organic solvent used to extract plutonium from aqueous solutions.

Other objects of this invention will be apparent from the description which follows.

The new compounds of plutonium of this invention are chelate compounds of tetravalent plutonium, Pu(IV), and a di(salicylal)alkylenediimine in which the diimine is represented by the general formula:

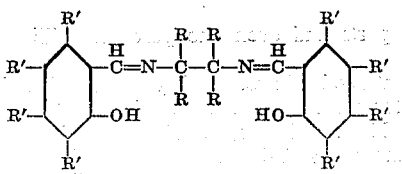

wherein R is a member of the group consisting of hydrogen and alkyl radicals and R' represents a wide variety of radicals including hydrogen, a halogen, a nitro group, an alkyl group, and an aryl group. These diimines are broadly termed di(salicylal)alkylenediimines wherein the divalent alkylene radical contains at least two carbon atoms and joins the two nitrogen atoms by means of two carbon atoms. The tetravalent plutonium chelate compounds are water-insoluble and are destroyed by aqueous acidic solutions having pH values of less than 2. They are soluble in substantially water-immiscible organic solvents. These chelate compounds may be used, for example, to coat foil which can be used in a neutron-detecting ion chamber, where plutonium will fission by neutron-bombardment producing $\beta$- and $\gamma$-radiation that will be detected in the chamber.

Examples of the diimines, from which these chelate compounds are prepared, are as follows:

Di(salicylal)ethylenediimine (i. e., di(2-hydroxybenzal)-ethylenediimine)
Di(2-hydroxy-3-methoxybenzal)ethylenediimine
Di(2-hydroxy-5-methylbenzal)ethylenediimine
Di(2,3-dihydroxy-6-phenylbenzal)ethylenediimine
Di(2-hydroxy-3-nitrobenzal)ethylenediimine
Di(2-hydroxy-3-bromobenzal)ethylenediimine
Di(2-hydroxy-5-chlorobenzal)ethylenediimine
Di(2-hydroxy-3-chlorobenzal)ethylenediimine
Di(2-hydroxy-3,5-dichlorobenzal)ethylenediimine
Di(2-hydroxy-3-chloro - 5 - tert - butylbenzal)ethylenediimine
Di(2-hydroxy-3-bromo - 5 - tert - butylbenzal)ethylenediimine
Di(2-hydroxy-3-isopropyl - 5 - chloro - 6 - methylbenzal)-ethylenediimine
Di(2-hydroxy-3,5-dimethylbenzal)ethylenediimine
Di(2-hydroxy-3-chloro - 4 - tert - butylbenzal)ethylenediimine
Di(2-hydroxy-5-tert-butylbenzal)ethylenediimine
Di(2-hydroxy-5-chloro-6-methylbenzal)ethylenediimine
Di(2,3 - dihydroxy - 5 or 6 - tert - butylbenzal)ethylenediimine [1]
Di(2-hydroxy-5-tert-amylbenzal)ethylenediimine
Di(2-hydroxy-3-methyl - 5 - tert - butylbenzal)ethylenediimine
Di(diamylsalicylal)ethylenediimine [2]
Di(2-hydroxy-(6-methyl-5-tert-butyl-and/or - 4 - methyl-5-tert-butyl)-benzal)ethylenediimine [3]
Di(2-hydroxy-4,6-dimethylbenzal)ethylenediimine
Di(salicylal)propylene-1,2-diimine

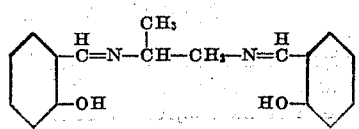

Di(salicylal)butylene-1,2-diimine

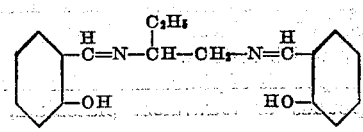

Di(salicylal)butylene-2,3-diimine

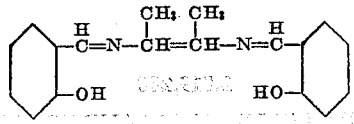

[1] The position of the tert-butyl group has not been established. An o-hydroxybenzaldehyde was prepared from 2-hydroxy-4-tert-butylphenol according to the Duff method (J. Chem. Soc. 1941, 547-50) by reacting said phenol and hexamethylenetetramine in the presence of anhydrous glycerol and glyceroboric acid at 150° C., cooling to 110° C., adding dilute sulfuric acid, recovering an o-hydroxybenzaldehyde derivative by steam distillation of the acidified reaction mixture, and condensing said salicylaldehyde derivative with ethylenediamine in a molal ratio of 2 to 1.
[2] The parent o-hydroxyaldehyde was prepared by the Duff reaction, supra, from commercially available "diamylphenol."
[3] The parent o-hydroxyaldehyde was prepared by the Duff reaction, supra, from 3-methyl-4-tert-butylphenol. Two isomers are possible, but no attempt was made to identify the aldehyde.

We have also found that these tetravalent plutonium chelate compounds can be made by contacting an aqueous solution containing a tetravalent plutonium salt having a pH between 2 and 7 with the di(salicylal)alkylenediimine. The diimine and plutonium react to form a water-insoluble compound. Two molecules of the diimine react with plutonium by replacing hydrogen atoms of the 2-hydroxyl groups. Also, tetravalent plutonium having a coordination number of eight forms a coordinate bond with the two nitrogen atoms of each molecule of the diimine, wherein plutonium shares electrons of the nitrogen atoms. The chelate compound precipitates from the aqueous solution. It is separated by filtration or other suitable means. The diimine may be used as an organic solvent solution and then the chelate compound is prepared by contacting the aqueous solution with this organic solvent solution and separating an aqueous phase and an organic solvent phase containing the chelate compound. For some solvents a true solution is not formed; instead, the solvent removes the chelate compound by a preferential wetting action. Of course, the diimine may be used alone in the initial contacting with the aqueous solution and the organic solvent may be added before removal of chelate compound. The organic solvent phase may be treated further to recover the chelate compound by removing the organic solvent, for example, by volatilization.

In another embodiment of this invention, plutonium is separated from the aqueous solution containing its tetravalent salt and having a pH between 2 and 7 by contacting with an organic solvent solution of the diimine, and separating an aqueous phase and an organic solvent extract phase containing the plutonium chelate compound.

In the foregoing process for the preparation of the plutonium chelate compound, it is preferred to use less than the stoichiometric amount of the diimine, so that resultant product is substantially free of unreacted diimine. However, in the second embodiment, wherein the process is the separation of plutonium, it is preferred that greater than a stoichiometric amount of diimine is used so that the maximum amount of plutonium is chelated-extracted from the aqueous solution.

The pH of between 2 and 7 for the aqueous solution of tetravalent plutonium salt is maintained by an acetate buffer in suitable concentration. An acetate buffer comprises acetic acid, an alkali acetate, such as sodium acetate and ammonium acetate, and mixtures of acetic acid and alkali acetate. The amounts of acetate buffer required for maintaining particular pH values are easily determined. On p. 509 of "Reference Book of Inorganic Chemistry," by Latimer and Hildebrand, revised edition, published in 1940, the concentrations of sodium acetate and acetic acid for various pH values are given. In Table I, below, there are presented the concentrations of ammonium acetate or mixtures of ammonium acetate and acetic acid that will provide certain pH values.

TABLE I

| For pH of— | Concentration of Ammonium Acetate, M | Concentration of Acetic Acid, M |
| --- | --- | --- |
| 3 | 0.03 | 1.65 |
| 4 | 0.1 | 0.55 |
| 5 | 0.2 | 0.11 |
| 6 | 0.9 | 0.05 |
| 7 | 1.0 | 0 |

If the aqueous solution before the addition of acetate buffer contains free inorganic acid, such as nitric acid and hydrochloric acid, so that the solution has a pH less than 2, the excess acid can be eliminated by adding alkali acetate in an amount sufficient to neutralize inorganic acid as well as to provide the required amount of alkali acetate buffer. If the reaction between inorganic acid and alkali acetate does not provide the requisite amount of acetic acid for the desired pH value, acetic acid is added. Of course, when the initial aqueous solution has a very great concentration of inorganic acid, part of the acid may be neutralized by the use of a strong base, such as sodium hydroxide.

The efficiency of chelation-extraction is not identical for all the di(salicylal)alkylenediimines. This is apparent from the data of examples to be presented below.

The organic solvent for the present invention is a substantially water-immiscible organic compound which is liquid at the temperature of carrying out the separation and preparation processes. Examples of suitable types of organic solvents are: halogenated hydrocarbons; hydrocarbons; alcohols; ethers; esters; and ketones. Specific examples are: chloroform; carbon tetrachloride; trichloroethylene; chlorobenzene; hexafluoroxylene: petroleum ether (having a boiling range between 35 and 55° C.); benzene; toluene; xylene, such as p-xylene; benzyl alcohol; cyclohexanol; diisoproyl ether; diethyl ether; n-butyl acetate; methyl isobutyl ketone; and cyclohexanone.

The amount of, or the concentration in the organic solvent of, the chelating agent, i. e., the di(salicylal) alkylenediimine, may be varied widely. For any particular operation the concentration will vary with the concentration of tetravalent plutonium salt in the aqueous solution. The ratio of organic solvent solution to aqueous solution may be varied widely, and the preferred range is between 5 to 1 and 1 to 5. The temperature at which the process is carried out may be varied considerably, for example, between room temperature and 95° C.

In the preparation and extraction processes the time of contact between the aqueous solution, containing the plutonium (IV) salt, such as chloride and nitrate, and the diimine varies with the temperature, the plutonium concentration, and the degree of chelation-extraction desired. Using tracer solutions a period of one to eight minutes at room temperature is adequate; however, with higher concentrations of plutonium, a contact time of at least one-half hour is preferred.

In another aspect of the second embodiment of the process of this invention, the aqueous solution also contains rare earth fission products. In this case, plutonium is chelated-extracted and the trivalent rare earth fission products remain in the aqueous solution. Thus, a mixture of plutonium and trivalent rare earth fission products may be separated by forming an aqueous solution thereof, providing the requisite pH by means of the acetate buffer, and then chelating-extracting as described above.

In a third embodiment of the present invention, plutonium is separated from solution in a substantially water-immiscible organic solvent of a tetravalent plutonium chelate compound of this invention by contacting said solution with an aqueous acidic solution having a pH less than 2 and separating an organic solvent phase and aqueous extract phase containing a plutonium salt.

A further embodiment comprises a combination of the second and third embodiments, whereby plutonium is transferred from one aqueous solution to another aqueous solution through the intermediate chelation-extraction. This combination is useful, for example, when sodium plutonyl acetate, $NaPuO_2(OAc)_3$, has been dissolved and it is desirable to have a plutonium solution free of sodium cations. Plutonium is reduced to the tetravalent state and the combination process is carried out. The final aqueous solution of plutonium salt contains no sodium cations.

Other embodiments will be apparent to those skilled in the art.

The following examples taken either alone or in combination are illustrative of the foregoing embodiments of the invention, both compounds and process. The terms "tracer concentrations," "tracer solutions," and "tracer scale" used hereinafter refer to concentrations of plutonium which were of the order of $10^{-8}$ to $10^{-10}$ M. Di(2,3-dihydroxy-5 or 6-tert-butylbenzal)diethylenediimine is referred to in the examples as "Disal." The experiments were carried out at room temperature, except where a different temperature is indicated.

Example I

In several series of experiments 10-ml. and 15-ml. quantities of aqueous solutions containing tracer concentrations of the tetravalent plutonium salt, plutonium tetranitrate, were buffered to the desired pH with sodium or ammonium acetate and acetic acid and the total acetate concentration ranged from 0.1 to 1 M. The resultant aqueous solutions were shaken vigorously for a few minutes in an ordinary separatory funnel each with an equal volume of chloroform cantaining from 10 to 20 mg. of a di(salicylal)ethylenediimine. After separation of the phases, the aqueous phase was evaporated to a small volume for plutonium assay. For analysis of the chloroform phase, the solvent was evaporated, the organic residue was destroyed with fuming $HNO_3$ and $HClO_4$, and the residue was taken up in water for plutonium assay.

For plutonium analyses the aqueous solutions were treated with $H_2O_2$ or $SO_2$ to produce the fluoride-insoluble Pu(III) or Pu(IV) state, $La^{+++}$ ion was added to provide a carrier and $LaF_3$ precipitations were made from solutions 1 to 5 M in HF. The fluoride precipitations were carried out in specially prepared plastic centrifuge tubes with bottoms flattened to form a smooth surface. The suspension was centrifuged, and the supernatant was poured off. The precipitate was washed carefully with a fine stream of water and was centrifuged again. With proper care, a uniformly thin $LaF_3$ precipitate could be deposited on the bottom of the plastic tube. After the second centrifugation the supernatant was poured off, and the precipitate on the bottom of the tube was dried carefully by a gentle stream of air while the tube was warmed gently above a hot plate. After the precipitate had dried, the bottom of the tube was cut off with a razor blade to form a very shallow cup with walls about $\frac{1}{32}$ to $\frac{1}{16}$ of an inch high. This disc with its $LaF_3$ deposit of less than 1.5 mg./cm.² was then used as the sample for alpha-counting using a counter having about 50% geometry.

Table II, below, presents a portion of the chelation extraction data obtained from these series of experiments.

TABLE II

| Di(salicylal)alkylenediimine Used | pH of Aq. Soln. | Percent Pu Extracted |
|---|---|---|
| Di(salicylal)ethylenediimine | 4.59 | 20.5 |
| | 5.52 | 93.0 |
| | 5.74 | 98.6 |
| | 6.14 | 95.9 |
| Di(2-hydroxy-3-methoxybenzal)ethylenediimine | 2 | 0.3 |
| | 4 | 54.4 |
| | 6 | 14.0 |
| | 8 | 1.5 |
| Di(2-hydroxy-5-methylbenzal)ethylenediimine | 3.20 | 11.8 |
| | 4.25 | 22.8 |
| | 5.38 | 57.0 |
| | 6.09 | 97.4 |
| Di(2,3-dihydroxy-6-phenylbenzal)ethylenediimine | 1.12 | 0 |
| | 2.85 | 43.8 |
| | 5.12 | 59.1 |
| | 5.98 | 86.0 |
| Di(2-hydroxy-3-bromobenzal)ethylenediimine | 2.61 | 28.8 |
| | 3.48 | 47.2 |
| | 5.30 | 34.2 |
| | 6.30 | 75.5 |
| Di(2-hydroxy-5-chlorobenzal)ethylenediimine | 2.33 | 26.2 |
| | 4.20 | 50.8 |
| | 5.02 | 47.0 |
| | 6.15 | 82.0 |
| Di(2-hydroxy-3-chlorobenzal)ethylenediimine | 2.29 | 25.4 |
| | 3.36 | 69.5 |
| | 5.45 | 75.6 |
| | 6.00 | 71.4 |
| Di(2-hydroxy-3,5-dichlorobenzal)ethylenediimine | 2.48 | 54.4 |
| | 3.26 | 83.9 |
| | 3.92 | 60.0 |
| | 5.85 | 71.0 |
| Di(2-hydroxy-3-chloro-5-tert-butylbenzal)ethylenediimine | 2.08 | 59.0 |
| | 2.75 | 97.1 |
| | 4.12 | 99.4 |
| | 5.66 | 94.0 |
| Di(2-hydroxy-3-bromo-5-tert-butylbenzal)ethylenediimine | 1.98 | 0.8 |
| | 3.22 | 40.4 |
| | 5.09 | 49.0 |
| | 5.50 | 65.0 |
| | 5.98 | 92.0 |
| Di(2-hydroxy-3-isopropyl-5-chloro-6-methylbenzal)ethylenediimine | 3.61 | 46.0 |
| | 4.70 | 81.0 |
| | 5.23 | 89.0 |
| | 5.82 | 89.0 |
| Di(2-hydroxy-5-tert-butylbenzal)ethylenediimine | 2.89 | 41.0 |
| | 4.52 | 89.0 |
| | 5.43 | 91.0 |
| | 6.98 | 21.0 |
| Di(2-hydroxy-5-chloro-6-methylbenzal)ethylenediimine | 2.75 | 9.0 |
| | 4.30 | 17.0 |
| | 4.91 | 37.0 |
| | 5.92 | 58.0 |
| Di(2,3-dihydroxy-5- or 6-tert-butylbenzal)ethylenediimine | 1.55 | 3.0 |
| | 1.98 | 83.5 |
| | 2.28 | 86.9 |
| | 2.95 | 99.9 |
| | 5.02 | 99.1 |
| | 5.98 | 97.4 |
| | 6.40 | 91.0 |

The foregoing data show the efficiency of the process of this invention for the separation of plutonium from aqueous solutions.

Example II

A series of extractions of plutonium on the micro scale, instead of the tracer scale of Example I, was carried out. In all experiments 1 ml. of aqueous solutions of a tetravalent plutonium salt buffered with acetate to a pH of about 4 were used. Solid "Disal" was added usually in an amount that was twice the theoretical quantity. The slurry was agitated in a microtube of a microextraction apparatus while complex formation took place. During the course of the reaction, the solid phase, i. e., the suspended organic reagent, of each experiment, changed from the yellow color of the reagent to the purple-black color of the tetravalent plutonium complex or chelate compound. In each experiment 1 ml. of chloroform was introduced into the vessel and the contents of the vessel were agitated by bubbling an inert gas into the two phases at a slow rate. After settling of the two phases, the heavier organic solvent phase was withdrawn from the tube through a tube open near the bottom of the microtube by the use of inert gas pressure above the two phases. The aqueous and chloroform phases were analyzed for plutonium content. Aliquots of the solutions were transferred with micropipets to platinum foils and each was evaporated carefully to produce a uniformly thin deposit. The margins of the platinum foil were coated with a lacquer to prevent the solution from creeping over the edges of the foil. Sometimes a drop of ethylene glycol was added to aid in the slow evaporation to a uniformly thin deposit. After the solution was evaporated to dryness, the foil was heated to a dull red heat to remove organic matter and volatile salts. This foil with its extremely thin deposit of plutonium was used for the determination of plutonium content by means of an alpha counter having about 50% geometry. The extraction data of the series of tests are presented below in Table III.

TABLE III

| Wt. of Pu Used, micrograms | Reaction Conditions | | Percent Pu Extracted into Chloroform |
|---|---|---|---|
| | Temperature, °C. | Time, hours | |
| 950 | 25–30 | 36 | 88.4 |
| 1,019 | 25–30 | 48 | 98.1 |
| 356 | 65–70 | 2.5 | 88.8 |
| 356 | 95 | 2.5 | 97.5 |
| 356 | 95 | 1 | 96.5 |

Example III

The tetravalent plutonium chelate compound of di(2-hydroxy-3-chloro-5-tert-butylbenzal)ethylenediimine also was prepared on the micro scale and it was a dark, reddish-brown compound.

Example IV

To an acetate-buffered solution containing 2.79 mg. of Pu(IV) at a pH of 4 was added an amount of "Disal" less than that required for reacting with all of the Pu(IV) present. The suspension was agitated for twelve hours at 80 to 90° C. for completion of the reaction. The organic complex was extracted with chloroform and the organic layer was washed with water.

The chloroform solution of the complex was evaporated and the residue was dried to constant weight at 100° C. The complex, almost black in color, was weighed and destroyed by digestion with $HNO_3$. The resulting solution was assayed for plutonium. The data are summarized below in Table IV.

TABLE IV

| | |
|---|---|
| Wt. of Pu used, mg | 2.790 |
| Wt. of dried Pu chelate compound, mg | 11.302 |
| Wt. of Pu in chelate compound by radioactive assay, mg | 2.569 |
| Calculated formula: PuR* | 1.98 |

*Where R is the "Disal" radical, i. e., the "Disal" molecule except for the two hydrogen atoms of the 2-hydroxy groups.

Thus, the formula of the plutonium chelate compound is:

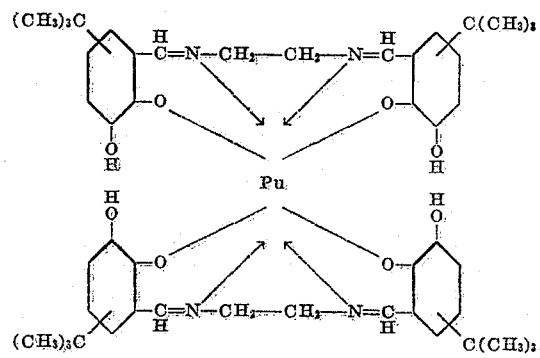

wherein the tert-butyl groups are in the 5- or 6-position.

Example V

Following the tracer extraction technique of Example I, using 20-ml. quantities of aqueous tracer solution of tetravalent plutonium salt buffered at a pH of 5.6, and using 20-ml. quantities of organic solvent containing "Disal" in separatory funnels, a series of extractions was carried out with a wide variety of organic solvents. The data are summarized below in Table V.

TABLE V

| Organic solvent used: | Percent Pu extracted |
|---|---|
| Petroleum ether (B. P. 35–55° C.) | 95.0 |
| Benzene | 98.9 |
| Toluene | 98.0 |
| p-Xylene | 99.4 |
| Chloroform | >99.5 |
| Carbon tetrachloride | 50.8 |
| Trichloroethylene | 85.4 |
| Benzyl alcohol | 98.4 |
| Cyclohexanol | 98.1 |
| Diisopropyl ether | 99.1 |
| Diethyl ether | 98.9 |
| n-Butyl acetate | 99.7 |
| Methyl isobutyl ketone | 99.0 |
| Cyclohexanone | 99.3 |

*Example VI*

In two series of experiments tracer solutions of tetravalent plutonium salt were buffered at pH values at which "Disal" gave virtually complete extraction of plutonium. These tracer solutions were treated as in Example I with organic solvents containing "Disal." In the series using aqueous tracer solutions having a pH between 3.91 and 3.98 and using chloroform the aqueous solutions contained a cupric salt, i. e., a Cu(II) salt. In the other series no Cu(II) salt was present and methyl isobutyl ketone, also called hexone, was used. The aqueous solutions in this series had a pH of 5.6. The solvent extract phases were agitated with nitric acid solutions of different concentrations. The solvent and nitric acid phases were separated and the degree of re-extraction by the nitric acid solution was determined. Table VI, below, summarizes the data obtained.

TABLE VI

| Organic Solvent | Percent Pu Extracted by Solvent | HNO₃ Used, N | Percent Pu Extracted by Acid Soln. | Overall Percent Pu in Acid Soln. |
|---|---|---|---|---|
| Chloroform | 99.7 | 0.05 | 83.7 | 82.6 |
| Do | 99.0 | 0.2 | 99.2 | 97.9 |
| Do | 98.7 | 0.4 | 99.6 | 98.6 |
| Do | 98.7 | 1.0 | 99.5 | 99.2 |
| Methyl isobutyl ketone | 99.6 | 0.1 | 94.8 | 94.4 |
| Do | 99.8 | 0.2 | 95.2 | 95.0 |
| Do | 99.5 | 0.4 | 97.8 | 97.4 |
| Do | 99.4 | 0.6 | 98.6 | 98.0 |
| Do | 99.4 | 0.8 | 96.6 | 96.9 |
| Do | 99.4 | 1.0 | 98.6 | 98.1 |

In the chloroform experiments the $Cu^{++}$ chelate compound or complex was stable in the presence of 0.05 and 0.2 N nitric acid but it was destroyed by 0.4 N nitric acid. The diimine reagent was attacked somewhat by 0.4 and 1 N nitric acids. In the methyl isobutyl ketone experiments the reagent was partially attacked by all nitric acid concentrations since nitric acid is fairly soluble in the ketone. The data show plutonium can be separated from organic solvent solutions of the plutonium chelate compounds of this invention by acid extraction. They also show that the combined extraction and re-extraction process will separate plutonium from some other materials originally present with it in an aqueous solution. The data indicate the organic solvent solution of diimine can be used for additional cycles of extraction and re-extraction.

*Example VII*

The behavior of "Disal" with various cations was determined by extraction experiments using tracer amounts and milligram amounts of ions from acetate-buffered solutions, 0.1 to 1 M in total acetate, and using chloroform as the organic solvent. The experiments were carried out in separatory funnels or in a microextraction apparatus in which agitation of phases was produced by a gas stream. In all cases, the volume of chloroform was equal to that of the aqueous solution.

Radioactive 33-year $Cs^{137}$ was used to determine the distribution of cesium in "Disal" extractions. Activities were measured by checking the radioactivity of $CsClO_4$ precipitates from the aqueous and organic solvent phases with a Geiger-Müller counter, which was the copper wall type with a mica window 5.2 mg./cm.² in thickness.

The behavior of barium was determined over a wide pH range with 12.8-day $Ba^{140}$. The tracer was recovered from the aqueous and organic solvent phases as $BaCO_3$ and the activity was determined with an electroscope of the Lauritsen quartz fiber type with a 2.4 mg./cm.² aluminum window.

A solution of $UX_1$ activity (24-day $Th^{234}$) was prepared by the ether extraction of uranyl nitrate. The buffered solution was extracted with "Disal" and chloroform, and the tracer was recovered by $La(OH)_3$ precipitations.

For extractions of zirconium, a sample of carrier-free zirconium tracer was used. Absorption measurements showed that the activity was at least 90% pure 68-day $Zr^{95}$. The tracer was recovered by $Fe(OH)_3$ precipitations and the activity determined with an electroscope.

The behavior of "Disal" solution in chloroform with tracer amounts of the various cations is summarized in Table VII.

TABLE VII

| Ion | pH of Aqueous Solution | Percent Activity Extracted |
|---|---|---|
| $Cs^+$ | 3.88 | 0.02 |
|  | 4.28 | 0.02 |
| $Ba^{++}$ | 1.93 | 0.24 |
|  | 3.35 | 12.5 |
|  | 4.80 | 17.9 |
|  | 5.12 | 22.6 |
|  | 5.80 | 21.5 |
| Mixture of $Ce^{+++}$ and $Y^{+++}$ | 3.28 | 0.09 |
|  | 3.85 | 0.37 |
| $Th^{++++}$ | 2.50 | 12.6 |
|  | 3.82 | 25.0 |
|  | 5.40 | 51.2 |
|  | 6.20 | 61.0 |
| $ZrO^{++}$ | 1.20 | 12.2 |
|  | 2.00 | 60.3 |
|  | 2.90 | 83.3 |
|  | 5.25 | 85.4 |

These data show that plutonium can be separated from alkali metals and trivalent rare earth elements, including trivalent lanthanum, with a high degree of efficiency. The separation from alkaline earth elements and thorium in one cycle of extraction and re-extraction would be fair. The data for thorium indicate the process is suitable for thorium recovery from aqueous solutions, especially when using several extractions.

*Example VIII*

Tracer solutions of radioactive rare earth elements buffered with ammonium acetate were contacted vigorously with equal volumes of chloroform solutions of di(salicylal)ethylenediimine and the two phases of each experiment were separated. The distribution of rare earth elements was determined by their radioactivities using an electroscope. The data are summarized below in Table VIII.

TABLE VIII

| pH of Aqueous Solution | Percent Rare Earth Elements Extracted |
|---|---|
| 5.34 | 1.4 |
| 5.54 | 1.3 |
| 5.76 | 0.8 |
| 6.00 | 0.7 |
| 6.27 | 1.3 |
| 6.50 | 0.8 |

These data in combination with the extraction data of Table II show the good separation of plutonium from its mixture with trivalent rare earth ions by the process of this invention.

*Example IX*

An aqueous solution containing a beryllium salt and having a pH of 5 was agitated with a chloroform solution of di(salicylal)ethylenediimine. Less than 0.1% of the $Be^{++}$, detected by quinalizarin, was found in the chloroform phase.

*Example X*

An aqueous solution of a magnesium salt having a pH of 6 was agitated with a chloroform solution of di(salicylal)ethylenediimine. No $Mg^{++}$ was detected by titian yellow in the chloroform phase.

The results of Examples IX and X in combination with the data in Table II show good separation of plutonium from its mixtures with alkaline earth elements using di(salicylal)ethylenediimine in the process of the present invention.

*Example XI*

Aliquots, each 20 ml., of an aqueous tracer solution of Pu(IV) salt were taken and buffered to pH values between 4.02 and 4.13. Lanthanum salt was added to provide concentrations of lanthanum ranging between 0.05 and 5 mg./ml. These solutions were agitated with chloroform solutions of "Disal." The separated chloroform phases contained at least 94% of the plutonium showing the process can separate plutonium from large amounts of lathanum.

*Example XII*

The sodium salt of di(salicylal)ethylenediimine was used in aliquots of a tracer solution of Pu(IV) salt and the solutions containing Cu(II) were buffered and extracted with chloroform. Using solutions having pH values of 5.90 and 6.08 the amounts of plutonium extracted were 67.2 and 74.0%, respectively. These data when compared wtih those in Table II indicate the method of Example I is preferred to the method of this example.

*Example XIII*

A series of experiments was carried out using tracer solutions of Pu(IV) salt buffered to pH values of 4.35 to 4.50. In each experiment 20 ml. of chloroform containing 25 mg. of "Disal" was used. The time of agitation of the separatory funnels was varied. The extraction data presented below in Table IX indicate the effect of agitation time upon the degree of plutonium chelation-extraction.

TABLE IX

| Time of agitation, min. | Percent extracted |
|---|---|
| 0.5 | 60.1 |
| 1.0 | 72.6 |
| 2.0 | 81.8 |
| 4.0 | 89.5 |
| 6.0 | 92.4 |
| 8.0 | 93.4 |

The process of the subject invention may also be utilized for the chelation-extraction of neptunium from an acetate-buffered aqueous solution of a tetravalent neptunium salt and from acetate-buffered solutions of $NpO_2^+$ and $NpO_2^{++}$ salts. The degree of extraction is relatively poor using di(salicylal)alkylenediimine for salts of the higher valence states of neptunium. For example, experiments using the diimines and aqueous solutions that were acetate-buffered to a pH of about 4 showed that about 10% of the neptunium was chelated-extracted from the tracer solution of the neptunium in its fluoride-soluble form, i. e., in its neptunyl state. The neptunyl state was obtained by oxidation using $KBrO_3$. When $KIO_3$ was used as the oxidizing agent, the amount of chelation-extraction varied between 4 and 32%. Tracer solutions of neptunium containing hydrochloric acid or nitric acid were acetate-buffered to a pH of about 4. Less than 10% neptunium was chelated-extracted. Similar acetate-buffered tracer solutions were treated with sulfur dioxide or formic acid or passed through a Jones reductor. The resultant solutions contained neptunium (IV) and extraction up to 90% was obtained.

Although the foregoing examples used solutions containing plutonium on the tracer scale and the microscale, the invention is not limited thereto. The examples, presented above, of this invention were batch experiments, but the chelation-extraction step and re-extraction step may be effected by the use of batch, continuous batch, batch countercurrent, or continuous countercurrent methods. It is preferred to use batch methods for the chelation-extraction step because of the time required for maximum chelation.

The foregoing illustrations and embodiments of this invention are not intended to limit its scope, which is to be limited entirely by the appended claims.

What is claimed is:

1. A tetravalent plutonium chelate compound of a di(salicylal)alkylenediimine wherein the divalent alkylene radical contains at least two carbon atoms and joins the two nitrogen atoms by means of two carbon atoms.

2. A tetravalent plutonium chelate compound of a di(salicylal)ethylenediimine.

3. A tetravalent plutonium chelate compound of di-(2-hydroxy-3-chloro-5-tert-butylbenzal)ethylenediimine.

4. A tetravalent plutonium chelate compound of di(2-hydroxy-5-tert-butylbenzal)ethylenediimine.

5. A process for the preparation of a tetravalent plutonium chelate compound of a di(salicylal)alkylenediimine wherein the divalent alkylene radical contains at least two carbon atoms and joins the two nitrogen atoms by means of two carbon atoms, which comprises contacting an aqueous solution containing a tetravalent plutonium salt and maintained at a pH between 2 and 7 by an acetate buffer with said di(salicylal)alkylenediimine, and separating the resultant tetravalent plutonium chelate compound.

6. The process of claim 5 in which the di(salicylal)alkylenediimine is a di(salicylal)ethylenediimine.

7. A process for the preparation of a tetravalent plutonium chelate compound of a di(salicylal)alkylenediimine wherein the divalent alkylene radical contains at least two carbon atoms and joins the two nitrogen atoms by means of two carbon atoms, which comprises contacting an aqueous solution containing a tetravalent plutonium salt and maintained at a pH between 2 and 7 by an acetate buffer with a solution in a substantially water-immiscible organic solvent of said di(salicylal)alkylenediimine, and separating an aqueous phase and an organic solvent extract phase containing the tetravalent plutonium chelate compound.

8. A process for the preparation of a tetravalent plutonium chelate compound of a di(salicylal)alklenediimine wherein the divalent alkylene radical contains at least two carbon atoms and joins the two nitrogen atoms by means of two carbon atoms, which comprises contacting an aqueous solution containing a tetravalent plutonium salt and maintained at a pH between 2 and 7 by an acetate buffer with a solution in a substantially water-immiscible organic solvent of said di(salicylal)alkylenediimine, separating an aqueous phase and an organic solvent extract phase containin gthe tetravalent plutonium chelate compound, and removing said organic solvent from said solvent extract phase.

9. A process for the separation of plutonium from an aqueous solution containing a salt of tetravalent plutonium and containing an acetate buffer to provide a pH between 2 and 7, which comprises contacting said aqueous solution with a solution in a substantially water-immiscible organic solvent of a di(salicylal)alkylenediimine wherein the divalent alkylene radical contains at least two carbon atoms and joins the two nitrogen atoms by means of two carbon atoms, and separating an aqueous phase and an organic solvent extract phase containing the resultant tetravalent plutonium chelate compound.

10. A process for the separation of plutonium from an aqueous solution containing a salt of tetravalent plutonium and containing an acetate buffer to provide a pH between 2 and 7, which comprises contacting said aqueous solution with a solution in a substantially water-immiscible organic solvent of a di(salicylal)ethylenediimine, and separating an aqueous phase and an organic solvent extract phase containing the resultant tetravalent plutonium chelate compound.

11. The process of claim 10 in which the organic solvent is chloroform and the pH of the aqueous solution is between 2 and 6.

12. The process of claim 10 in which the organic solvent is a xylene, the pH of the aqueous solution is between 2 and 6, and the di(salicylal)ethylenediimine is di(2,3-dihydroxy-tert-butylbenzal)ethylenediimine.

13. The process of claim 10 in which the organic solvent is methyl isobutyl ketone, the pH of the aqueous solution is between 2 and 6, and the di(salicylal)ethylenediimine is di(2,3 - dihydroxy - tert - butylbenzal)ethylenediimine.

14. The process of claim 10 in which the di(salicylal)-ethylenediimine is di(2-hydroxy-3-chloro-5-tert-butylbenzal)-ethylenediimine.

15. The process of claim 14 in which the organic solvent is chloroform and the pH of the aqueous solution is between 2 and 6.

16. The process of claim 10 in which the di(salicylal)-ethylenediimine is di(2-hydroxy-5-tert-butylbenzal)ethylenediimine.

17. The process of claim 16 in which the organic solvent is chloroform and the pH of the aqueous solution is between 4 and 6.

18. A process for the separation of plutonium from an aqueous solution containing a salt of tetravalent plutonium and an acetate buffer to provide a pH between 2 and 7, which comprises contacting said aqueous solution with a solution in a substantially water-immiscible organic solvent of a di(salicylal)alkylenediimine wherein the divalent alkylene radical contains at least two carbon atoms and joins the two nitrogen atoms by means of two carbon atoms, separating an aqueous phase and an organic solvent extract phase containing the resultant tetravalent plutonium chelate compound, contacting said organic solvent extract phase with an aqueous acidic solution having a pH of less than 2, and separating an organic solvent phase and an aqueous extract phase containing a plutonium salt.

19. A process for the separation of plutonium from a mixture of plutonium and rare earth fission products, which comprises dissolving said mixture in an acid solution, providing an acetate buffer in an amount sufficient to provide a pH of the aqueous solution between 2 and 7, contacting the resultant aqueous solution containing a tetravalent plutonium salt and trivalent rare earth salts with a solution in a substantially water-immiscible organic solvent of a di(salicylal)alkylenediimine wherein the divalent alkylene radical contains at least two carbon atoms and joins the two nitrogen atoms by means of two carbon atoms, and separating an aqueous phase containing salts of said rare earth fission products and an organic solvent extract phase containing the resultant tetravalent plutonium chelate compound.

20. A process for the separation of plutonium from a substantially water-immiscible organic solvent solution of a tetravalent plutonium chelate compound of a di(salicylal)alkylenediimine wherein the divalent alkylene radical contains at least two carbon atoms and joins the two nitrogen atoms by means of two carbon atoms, which comprises contacting said organic solvent solution with an acidic aqueous solution having a pH less than 2, and separating an organic solvent phase and an aqueous extract phase containing a plutonium compound.

21. The process of claim 20 in which the tetravalent plutonium chelate compound is a chelate compound of di(2,3-dihydroxy-tert-butylbenzal)ethylenediimine.

22. The process of claim 21 in which the organic solvent is chloroform.

23. The process of claim 20 in which the organic solvent is methyl isobutyl ketone.

24. The process of claim 20 in which the tetravalent plutonium chelate compound is a chelate compound of di(2-hydroxy-3-chloro-5-tert-butylbenzal)ethylenediimine.

25. The process of claim 20 in which the tetravalent plutonium chelate compound is a chelate compound of di(2-hydroxy-5-tert-butylbenzal)ethylenediimine.

References Cited in the file of this patent

Harvey et al.: The Chemistry of Plutonium, Journal of the Chemical Society, August 1947, pp. 1010–1021.

UNITED STATES PATENT OFFICE

Certificate of Correction

Patent No. 2,819,280

January 7, 1958

Frederick J. Wolter et al.

It is hereby certified that error appears in the printed specification of the above numbered patent requiring correction and that the said Letters Patent should read as corrected below.

Column 4, lines 2 to 7, the formula should read as shown below instead of as in the patent—

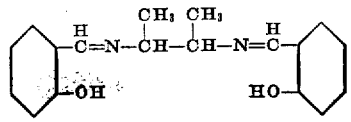

column 10, line 12, for "$C_s^{137}$" read —$Cs^{137}$—; line 14, for "$C_sClO_4$" read —$CsClO_4$—; column 12, line 22, for "90%" read —96%—.

Signed and sealed this 18th day of November 1958.

[SEAL]

Attest:
KARL H. AXLINE,
*Attesting Officer.*

ROBERT C. WATSON,
*Commissioner of Patents.*